Patented Sept. 5, 1950

2,521,416

UNITED STATES PATENT OFFICE 2,521,416

N-HYDROXYPHENYL-ISOINDOLINES

Louis Schmerling, Riverside, Ill., assignor to Universal Oil Products Company, Chicago, Ill., a corporation of Delaware No Drawing. Application February 8, 1949, Serial No. 75,308

3 Claims. (Cl. 260—319)

This application is a continuation-in-part of co-pending application Serial No. 737,422, filed March 26, 1947.

This invention relates to a novel composition of matter.

In a broad embodiment, the present invention relates to a novel composition of matter comprising hydroxyphenyl-isoindolines.

In a specific embodiment the present invention comprises N-(4-hydroxyphenyl)-isoindoline.

N-(4-hydroxyphenyl)-isoindoline has the following formula:

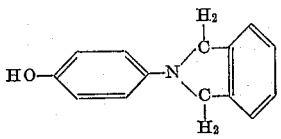

N-(4-hydroxyphenyl)-isoindoline may be prepared by reacting xylylene dihalide with p-aminophenol at a suitable temperature which may range from about 50° to about 200° C. and preferably is of the order of 75–100° C. This reaction may readily be effected by refluxing the reactants in the presence of a suitable solvent such as ethyl alcohol, after which the products are allowed to cool and then may be recovered by filtering and recrystallization.

Referring to the structural formula hereinbefore set forth, it is understood that the aromatic rings and/or the heterocyclic ring may contain various further substituents including alkyl, aryl, aralkyl, alkaryl, alkoxy, aralkoxy, hydroxy, etc. radicals and that these alternative, but not necessarily equivalent, compounds may be prepared by further alkylating the above compound or by the use of other starting materials in the preparation of the novel composition of matter of the present invention.

It will be noted that hydroxyphenyl-isoindoline may or may not contain one double bond in the heterocyclic ring depending upon the interpretation of the double bond in the aromatic ring.

In the preferred compounds of the present invention, the hydroxy radical attached to the aromatic ring is in a position para to the nitrogen atom. However, it is understood that compounds in which the hydroxy group is in the ortho or meta position are comprised within the scope of the present invention and that these various compounds are not necessarily equivalent.

The compounds of the present invention will have particular utility for use as an inhibitor in the stabilization of an organic material subject to oxidative deterioration and particularly for use in the stabilization of cracked gasoline.

The following example is introduced to illustrate further the novelty and utility of the present invention but not with the intention of unduly limiting the same.

Example

N-(4-hydroxyphenyl)-isoindoline was prepared as follows: 16 g. of p-aminophenol and 13 g. of xylylene dibromide were refluxed in the presence of 150 cc. of absolute ethyl alcohol at a temperature of 79° C. for 4 hours. The product was cooled and filtered to separate 12 grams of white nacreous flakes which were recrystallized from hot ethyl alcohol to recover the desired compound having a melting point of 215° C.

I claim as my invention:

1. A novel composition of matter comprising an N-hydroxyphenyl-isoindoline.
2. N-(4-hydroxyphenyl)-isoindoline.
3. An N-hydroxyphenyl-isoindoline consisting of carbon, hydrogen, nitrogen and oxygen.

LOUIS SCHMERLING.

REFERENCES CITED

The following references are of record in the file of this patent:

UNITED STATES PATENTS

| Number | Name | Date |
|---|---|---|
| 1,899,058 | Reed | Feb. 28, 1933 |